United States Patent Office 3,473,008
Patented Oct. 14, 1969

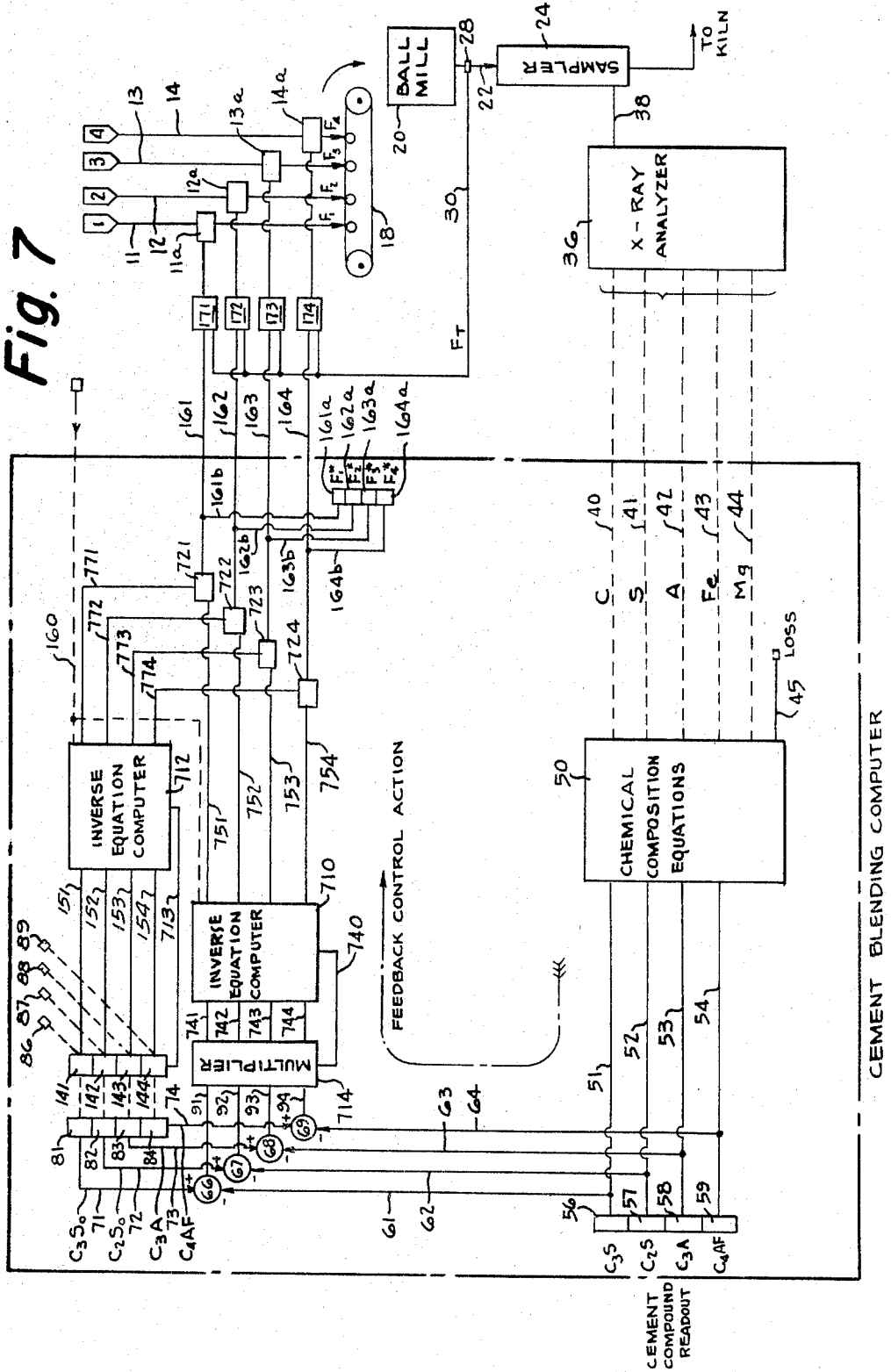

3,473,008
SYSTEM FOR FEED BLENDING CONTROL
Theodosios Bay and Tai-Seng Chen, Lansdale, and John W. Schwartzenberg, Maple Glen, Pa., assignors to Leeds & Northrup Company, Philadelphia, Pa., a corporation of Pennsylvania
Filed June 12, 1964, Ser. No. 374,773
Int. Cl. G06f 15/46
U.S. Cl. 235—151.12          12 Claims

ABSTRACT OF THE DISCLOSURE

A system for continuously controlling the feed rate of raw materials to be blended into a mixture for burning in a cement kiln so as to give a minimum cost mixture while keeping the cement compounds obtained within a predetermined range. The system measures the oxides in the blended stream of raw materials and converts those measurements to signals representing the expected cement compounds which should result. The signals representing the expected element compounds are compared with signals representing the desired cement compounds and the difference is integrated to produce a feedback control signal which is used to modify the feed rate controls.

---

This invention relates to a method and means for determining the feed rates of each of a plurality of streams to be blended so that the composition of the blended streams corresponds to a predetermined desired composition. More particularly, this invention relates to a method and means for determining the feed rate which is required for each of a plurality of raw feed materials to be blended so that after the burning of the blended material in a kiln there is produced a cement mixture having predetermined relative amounts of each of its constituent cement compounds.

In the usual cement process there is utilized a plurality of storage silos or bins, each of which is kept supplied with different rock as might be obtained from nearby quarries. These different supplies of rock usually contain differing percentage amounts by weight of the constituent oxides calcium oxide (CaO), silica ($SiO_2$), alumina ($Al_2O_3$), ferric oxide ($Fe_2O_3$) and magnesium oxide (MgO). Rock from each of the bins is fed at a different rate to a means for crushing and blending the rock, as for example, a ball mill. The blended raw materials from the ball mill are then collected in a product basin over a long period of time with the material in the product basin being stirred constantly to maintain a homogeneous composition therein. When the product basin has accumulated a sufficient amount of the blended crushed rock, this material is then fed into a rotating kiln, where it is ignited and burned so that the non-volatile material produces a clinker and the volatile material is driven off. This clinker when ground to a powder form is the final cement product.

In the burning process the oxide constituents mentioned above produce a clinker which may, for the purpose of description, be considered as composed of tricalcium silicate, tricalcium aluminate, dicalcium silicate and tetracalcium aluminoferrite which are the constituent chemical compounds making up the cement product. For convenience, these compounds are usually represented by the symbols $C_3S$, $C_3A$, $C_2S$, and $C_4AF$, respectively. In addition to these compounds, there will, of course, be some inert materials and magnesium oxide which will not enter into the chemical reactions during the burning process.

In some cement processing no product basin is utilized for storage of the blended feed materials but instead the feed materials go directly from the ball mill into the kiln. While such a process is more difficult to control, the present invention will be described in an alternate form which accommodates the absence of storage of the blended materials.

In order to maintain both a high quality cement product and a minimum cost, it is important that the relative quantities of the constituent cement compounds be closely controlled in the cement product. Within the allowable tolerances for the values of these relative quantities, it is frequently desirable to utilize to a maximum degree the cheapest of the raw materials to minimize the cost of the final cement product without sacrificing its quality.

In order to accomplish such an objective, the feed rates of each of the raw materials from the storage bins must be controlled. Such control is complicated by the fact that the composition of the various raw materials is variable and cannot be accurately measured. Also, since each of the raw materials contains different amounts of all of the constituent oxides, the change in the feed rate of one of the raw materials causes a change in the relative quantities of all of the oxides in the blended feed material. In addition, further problems arise from the fact that the composition of the available raw materials may at times be such that there is no possible combination or blend of these raw materials which will make the desired cement product composition. Thus, for a period of time at least, an improper blend of materials is added to the product basin regardless of the adjustments of the feed rates. It is desirable to later correct this poor mixture when suitable raw materials do become available so that upon completion of the filling of the product basin the desired blend of the constituent oxides will be present.

In addition, such disturbances as a rock jam in one of the storage bins may prevent rock from being fed from that particular bin thus causing an improper blend to be fed to the storage bin.

To allow the operators of cement plants to produce the desired product in spite of the above mentioned difficulties, it is an object of this invention to provide a novel and improved system for computing the feed rates of each of a plurality of streams to be blended as required to establish the desired mixture therefrom.

It is another object of this invention to provide a novel method and/or means for computing the feed rates of a plurality of raw materials which are to be blended and burned as is required to make cement with constituent cement compounds in predetermined desired relative amounts.

A still further object of this invention is the provision of a novel method and/or means for controlling the composition of a blend of a plurality of different raw materials so as to continuously produce a product having relative amounts of its constituents maintained as closely as possible at predetermined holding points.

A still further object of this invention is the provision of a novel analog computer for solving implicity a set of simultaneous equations in which the dependent variables are known and the independent variables are constrained to positive and limited magnitudes and where it is desirable to minimize the sum of the squares of the deviations of the dependent variables from predetermined desired values when a unique solution is unobtainable.

An additional object of this invention is the provision of a novel means for solving a set of simultaneous equations when the dependent variables are known and the independent variables are constrained to positive and limited magnitudes and it is desired that the deviation of these computed dependent variables from their desired values should be substantially equal in terms of percentage of desired value or holding point.

For carrying out the above objects this invention provides a system for controlling the feed rates of each of a plurality of raw materials which are to be blended and ignited for burning so as to produce a cement product having a predetermined desired mixture of the several cement compounds resulting from this burning. This system comprises a means which is operable to produce a plurality of first feedback signals each representative of one of the constituent oxides in the blended raw material. These first feedback signals are then converted by other means to second feedback signals, each of which represents the relative amount of a particular cement compound which is expected to result from the burning of the constituent oxides in the blended raw material. These second feedback signals are then compared by a comparing means to corresponding signals representing predetermined holding point values for those constituent cement compounds. The resulting difference is integrated to produce individual feedback control signals representing the deviation from its particular desired holding point value of each of the constituent cement compounds in the accumulated batch mixture. There is also utilized a means for computing the individual raw material feed rates in accordance with the predetermined holding point values and the above mentioned feedback control signals are introduced into the computation as a means for correcting the computed feed rates to take into account the deviations which have occurred in the constituent oxides which make up the blended raw feed in the batch mixture. In accordance with these computed feed rates the actual feed rates are then controlled.

The computing means for establishing the individual raw material feed rates in accordance with the predetermined holding point values and the feedback control signals includes a means which is adjustable in accordance with the relative amounts of the constituent oxides in each of the raw materials being blended at the existing computed feed rates. Those oxides signals are utilized by means responsive to them as well as to the signals representing the holding point values and the feedback control signals to establish from those several signals error signals which represent the deviation of the relative amount of each of the constituent cement compounds. Means are utilized for modifying each of the error signals in accordance with individual first weighting factors in accordance with the closeness of control which is desired for each of the particular constituent cement compounds. Those modified error signals are effective through means responsive to them to establish signals representing the errors in the rates at which the blended feed is supplying the constituent oxides as that rate is modified by the modifying means. Means are also provided which are responsive to these signals as well as to other weighting factors which are indicative of the cost of the corresponding individual raw material being blended in order to establish feed rate error signals for each of the raw materials. These feed rate error signals are then integrated to establish corrected computed feed rate values from which the actual feed rates are controlled.

For further objects and advantages of the invention and for a more detailed discussion of the same, reference may be had to the following description taken in conjunction with the accompanying drawings in which like reference characters identify like elements and in which:

FIG. 6 is a diagram showing the manner in which FIGS. 3, 4 and 5 may be joined to obtain the overall detailed diagram of the control system of this invention; and FIG. 7 is a simplified diagrammatic showing of a variation of the control system of FIG. 1.

Figure 1:
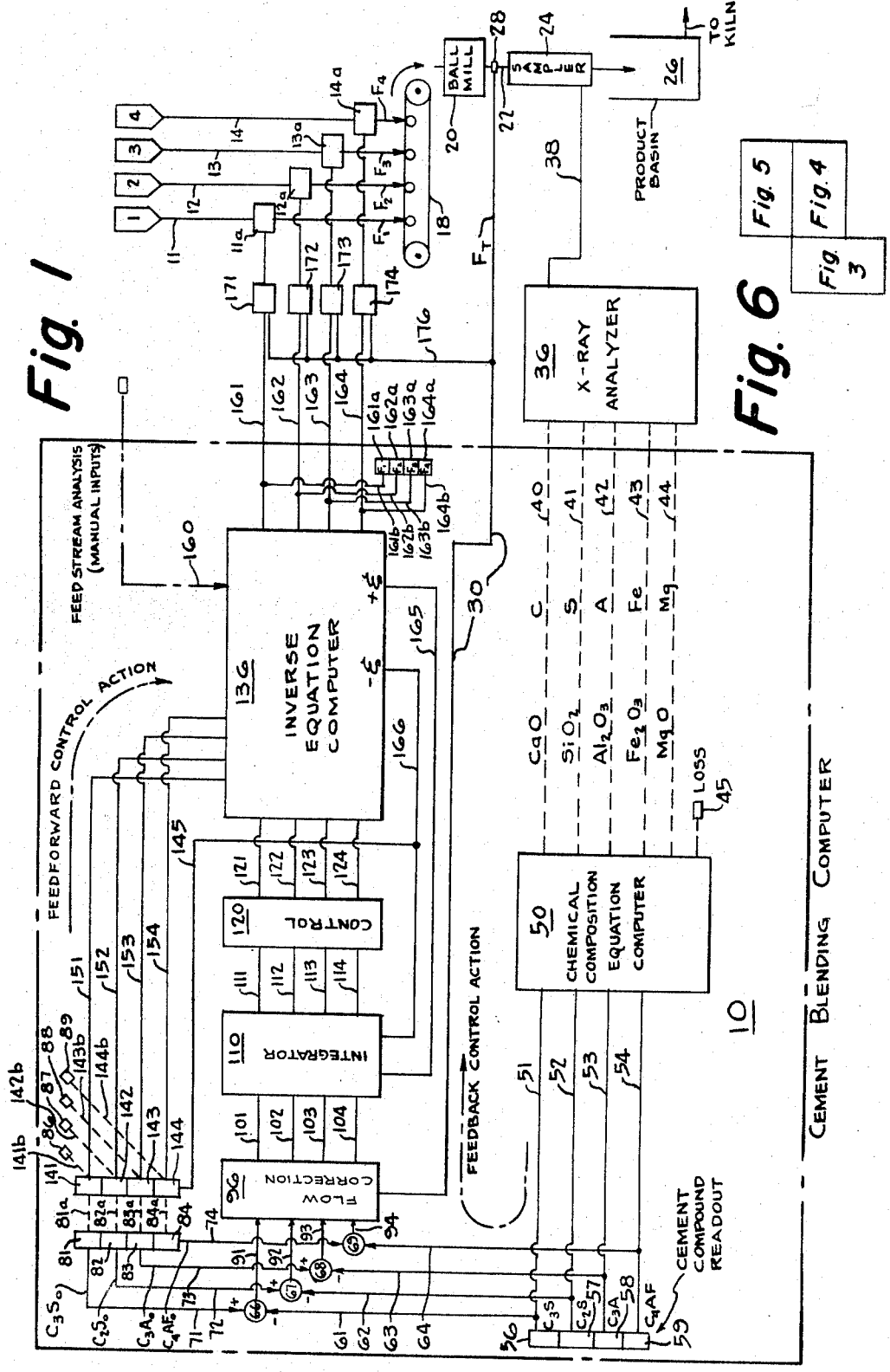
FIG. 1 is a diagrammatic showing of the overall control system of the invention.

In FIG. 1 the individual storage bins 1-4 are graphically shown as a means for storing the feed rock which makes up the raw material from which cement is to be produced. These storage bins each supply a stream of feed rock in their respective feed streams 11-14 by way of individual feed control mechanisms which are respectively shown as control elements 11a-14a. The feed streams 11-14 supply the raw material to a conveyor belt 18 which in turn carries it to a ball mill 20. The feed material after being crushed and blended by the ball mill 20 is supplied by way of a feed line 22 through a sampler 24 to a product basin 26. In the blended feed stream 22 there is utilized a measuring unit 28 for obtaining a signal $Ft$ on a line 30 indicative of the rate of feed of the blended material or in other words the total feed rate of raw material.

The sampler 24 is operative in conjunction with the X-ray analyzer 36 by way of the connection therebetween, shown as 38, to produce an analysis of the relative magnitudes of the constituent oxides which make up the blended feed stream, namely, calcium oxide, silica, alumina, ferric oxide, and magnesium oxide. This sampling and analysis can be either on a continuous or periodic basis. For purposes of description, the continuous arrangement will be described. These relative quantities are represented by the positions of a plurality of output shafts 40-44 which respectively are positions representing relative quantities of the above mentioned oxides. The manually adjusted position of a shaft 45 represents the loss L or the inert material in feed line 22. The sampler 24 and the X-ray analyzer 36 may be any of several available types of analyzing equipment which are suitable for providing a continuous analysis of the blended raw feed material.

The product basin 26 collects the blended raw feed material for a long period of time. This time may, for example, be on the order of 72 hours. During the time when this material is being collected in the basin 26, it is constantly being stirred by any of a number of suitable means so as to maintain the homogeneity of the mixture. When the basin becomes full, it is then fed to the cement kiln (not shown in FIG. 1) which, as has been mentioned, will usually be of the rotary type.

Because of the variations which occur in the make up of the raw feed material and because of the difficulty in accurately measuring the concentrations of the several oxides in each of the raw feed streams, it has been found to be desirable to establish a feedback control signal which will be indicative of the deviation of the material collected in the product basin 26 from that which is necessary to produce the desired final product composition. To that end the positions of the shafts 40-45 may be considered as first feedback signals which are fed to the chemical composition equation computer 50 where those signals are modified to produce on the output lines 51-54 second feedback signals representing respectively the expected relative quantities of the constituent cement compounds, tricalcium silicate, dicalcium silicate, tricalcium aluminate and tetracalcium aluminoferrite in the final cement product. These relative quantities can be read out as by any suitable type of meter shown as 56-59 for the respective compounds so that the operator will have a visual indication of the existing values for those relative quantities as an operating guide.

The several second feedback signals from lines 51-54 are connected by way of corresponding lines 61-64 to a respective comparison means 66-69 where those signals are compared with the signals supplied on lines 71-74 from adjustable sources of potential, as for example handset potentiometers 81–84, respectively. These potentiometers may be adjusted by means of adjustable knobs 86–89 so that the signals which appear on lines 71–74 correspond respectively with the desired holding point values for the relative quantities of the constituent cement compounds whose measured relative quantity values are represented respectively by the signals 61–64.

The differences between the respective signals 61–64 and signals on lines 71–74 are then fed by way of lines 91–94 to a flow correction device 96 which is provided to allow for a correction proportional to the total flow of the blended raw materials, $F_t$, in response to the signal on line 30.

From the flow correction unit 96 there is supplied by way of lines 101–104 flow corrected deviation signals indicative of the deviation of the constituent cement compounds which would result from the feed material presently being supplied by way of feed stream line 22 to the product basin 26 as compared with the desired holding point values for those cement compounds. These signals are then integrated in an integrator unit 110. The results of this integration are aslo multiplied by a factor $\xi$ in the integrator 110. This factor serves to convert the signals to an unburned basis. The reason for this conversion will be evident from the description of the more detailed FIGURES 3, 4 and 5. The output of the integrator unit 110 provides on lines 111–114 signals representing the accumulated cement compound deviation on an unburned or raw basis.

Each of these signals on lines 111–114 represents the deviation of a different one of the constituent cement compounds and these signals are individually modified by a controller 120 which, for example, may serve to multiply each of the signals from lines 111–114 by an individual constant to produce on the output lines of the control unit 120, namely, lines 121–124, feedback control signals which may be utilized to correct the control system which adjusts the feed rate by way of the feed control elements 11a–14a.

The control system for adjusting the feed controllers 11a–14a is shown in FIG. 1 as consisting of an inverse equation computer 136 whose inputs include not only the signals on lines 121–124 but also signals on lines 151–154 representing the desired holding points for the several constituent chemical compounds on an unburned or raw basis, which signals result from the adjustment of the individual potentiometers 141–144 respectively by the manual adjustment of knobs 86–89. Thus, as shown in FIG. 1, the potentiometers 141–144 are mechanically connected to or ganged with the potentiometers 81–84 by way of connections 81a–84a so that the signals which are produced on lines 151–154 are related to those produced on lines 71–74 respectively by the factor $\xi$ introduced as a voltage source for potentiometers 141–144 by a line 145.

Another input to the inverse equation computer 136 comprises the manually adjusted inputs representing the percentage by weight of the individual constituent oxides in each of the different types of rock stored in the several storage bins 1–4. These adjustments would be made as a result of an analysis of the rock being stored in each of the bins when the bins are being filled, and the analysis would therefore generally be applicable to the conditions which would maintain until the bins are again refilled. Thus, the feed stream analysis manual inputs 160 graphically represents the plurality of inputs as will be evident from a further more detailed description in connection with FIGS. 4 and 5.

The inverse equation computer 136, which will be described in more detail later, is so constructed that the above mentioned inputs serve to produce as outputs on lines 161–164 signals which respectively represent normalized values of the rate of feed of the raw materials as required from the respective bins 1–4. These normalized feed rates are indicated on the respective indicating devices 161a–164a which are connected by lines 161b–164b to the lines 161–164 respectively. These indicating devices may be meters similar to meters 56–59. Also, signals $+\xi$ and $-\xi$ are produced on lines 165 and 166. The normalized rate of feed signals are converted to desired feed rates by multiplication by $Ft$. This multiplication can be accomplished in the individual feed control units 171–174 which receive the normalized feed rate signals from lines 161–164, respectively. Thus, the signal which appears on line 30 is supplied to the feed control units 171–174 over line 176. In addition to this multiplication the feed control units 171–174 may include other necessary control functions as may be useful in the control of the feed controllers 11a–14a.

The feed control units 171–174 and the feed control elements 11a–14a are shown in block diagram form only. It will be evident to those skilled in the art that these control units and control elements may be any of a number of different types of units depending upon the particular manner in which the raw material is fed to the conveyor belt 18 and depending upon the control functions which are required for effecting the control of that feed.

For an understanding of the inverse equation computer 136 of FIG. 1, it is desirable to consider the mathematical relationships which are involved in the computation performed by the computer. In this connection the following Equations 1–5 relate the oxide composition of the blended feed stream 22 to the compositions of the individual feed streams from the feed bins 1–4, namely the streams 11–14. Equation 6 relates the inert material in each of the streams $L_1$–$L_4$ to the total inert material L and Equation 7 relates the feed rates $F_1$–$F_4$ of streams 11–14 to the total feed rate $Ft$. For convenience of notation the oxides are indicated by the terms C, S, A, Fe and Mg which respectively correspond to calcium oxide, silica, alumina, ferric oxide and magnesium oxide.

$$CF_T = C_1F_1 + C_2F_2 + C_3F_3 + C_4F_4 \quad (1)$$
$$SF_T = S_1F_1 + S_2F_2 + S_3F_3 + S_4F_4 \quad (2)$$
$$AF_T = A_1F_1 + A_2F_2 + A_3F_3 + A_4F_4 \quad (3)$$
$$FeF_T = Fe_1F_1 + Fe_2F_2 + Fe_3F_3 + Fe_4F_4 \quad (4)$$
$$MgF_T = Mg_1F_1 + Mg_2F_2 + Mg_3F_3 + Mg_4F_4 \quad (5)$$
$$LF_T = L_1F_1 + L_2F_2 + L_3F_3 + L_4F_4 + \quad (6)$$
$$F_T = F_1 + F_2 + F_3 + F_4 \quad (7)$$

where

C, S, A, Fe, Mg = the oxide compositions of the blended stream in percentage by weight on a non-ignited (raw) basis.

L = the inert material of the blended stream in percentage by weight on a non-ignited basis.

$C_i$, $S_i$, $A_i$, $Fe_i$, $Mg_i$ = the oxide compositions of the individual feed streams in percentage by weight on a non-ignited basis.

$L_i$ = the inert material of the individual feed streams in percentage by weight on a non-ignited basis.

$F_i$ = the mass flow rate of the individual streams (#/hr.).

$F_T$ = the mass flow rate of the blended stream (#/hr.).

In general the sum of the various oxide compositions of the feed material will not equal 100% (on a non-ignited basis). This results from the presence of combined $CO_2$ in the form of carbonates in the cement rock. The $CO_2$ is, of course, driven off when the feed material is burned in the kiln and does not therefore make up a part of the cement product. We can therefore define the following terms $$\xi = (C + S + A + Fe + Mg + L)/100\% \quad (8)$$
$$\xi_i = C_i + S_i + A_i + Fe_i + Mg_i + L_i)/100\% \quad (9)$$

where $\xi$ and $\xi_i$ have the units of weight fraction. Using this notation it will now be convenient to write one additional equation which is the sum of Equations 1 to 6.

$$\xi F_T = \xi_1 F_1 + \xi_2 F_2 + \xi_3 F_3 + \xi_4 F_4 \quad (10)$$

This above equation is actually a continuity equation relating the flows on an ignited (or product) basis rather than a non-ignited basis as given in Equation 7. Now for future work it will be useful to normalize the individual flows to the total flow $F_T$. Thus we have $$F_1^* = \frac{F_1}{F_T},\ F_2^* = \frac{F_2}{F_T},\ F_3^* = \frac{F_3}{F_T},\ F_4^* = \frac{F_4}{F_T}$$

Substituting the normalized flows in Equations 1-6 and writing in matrix notation for simplicity, we have $$\begin{bmatrix} C \\ S \\ A \\ Fe \\ Mg \\ L \end{bmatrix} = \begin{bmatrix} C_1 & C_2 & C_3 & C_4 \\ S_1 & S_2 & S_3 & S_4 \\ A_1 & A_2 & A_3 & A_4 \\ Fe_1 & Fe_2 & Fe_3 & Fe_4 \\ Mg_1 & Mg_2 & Mg_3 & Mg_4 \\ L_1 & L_2 & L_3 & L_4 \end{bmatrix} \begin{bmatrix} F_1^* \\ F_2^* \\ F_3^* \\ F_4^* \end{bmatrix} \quad 0 < F_i^* < 1 \quad (11)$$

We also have the two forms of the continuity equation $$\xi = \xi_1 F_1^* + \xi_2 F_2^* + \xi_3 F_3^* + \xi_4 F_4^* \quad (12)$$
$$l = F_1^* + F_2^* + F_3^* + F_4^* \quad (13)$$

The four cement compounds, obtained when the raw feed material is ignited and burned in the kiln, are related to the oxide compositions (on a non-ignited basis) by means of the following inverted stoichiometric equations:

$$\begin{aligned}
C_3S &= (1/\xi)[4.071C - 7.6S - 6.718A - 1.43Fe] \\
C_2S &= (1/\xi)[-3.071C + 8.6S + 5.068A + 1.079Fe] \\
C_3A &= (1/\xi)[\qquad\qquad\qquad\qquad 2.65A - 1.692Fe] \\
C_4AF &= (1/\xi)[\qquad\qquad\qquad\qquad\qquad\quad 3.043Fe]
\end{aligned} \quad (14)$$

or in matrix from $$\begin{bmatrix} C_3S \\ C_2S \\ C_3A \\ C_4AF \end{bmatrix} = \frac{1}{\xi} \begin{bmatrix} 4.071 & -7.6 & -6.718 & -1.43 \\ -3.071 & 8.6 & 5.068 & 1.079 \\ 0 & 0 & 2.65 & -1.692 \\ 0 & 0 & 0 & 3.043 \end{bmatrix} \begin{bmatrix} C \\ S \\ A \\ Fe \end{bmatrix} \quad (15)$$

It should be noted at this time that the terms Mg and L take no part in the chemical reactions, for the magnesium oxide does not enter into the reaction itself and the inert materials as represented by the symbol L likewise take no part in the chemical reaction. These two terms do, however, affect the quantity of material which makes up the final product and therefore affect the value of $\xi$.

Combining the chemical composition Equations 15 symbolized by [CC] with the oxide Equations 11 we obtain $$\begin{bmatrix} C_3S \\ C_2S \\ C_2A \\ C_4AF \end{bmatrix} = \frac{1}{\xi} \begin{bmatrix} CC \end{bmatrix} \begin{bmatrix} C_1 & C_2 & C_3 & C_4 \\ S_1 & S_2 & S_3 & S_4 \\ A_1 & A_2 & A_3 & A \\ Fe_1 & Fe_2 & Fe_3 & Fe_4 \end{bmatrix} \begin{bmatrix} F_1^* \\ F_2^* \\ F_3^* \\ F_4^* \end{bmatrix} \quad (16)$$

Equations 16 and 12 thus define the composition of the cement product in terms of the four cement compounds as derived from computation based on the four normalized flows of the feed streams 11-14 of FIG. 1. It should be noted, however, that due to the continuity relationship Equation 13, only three flows are independent variables. Therefore, only three of the cement compounds can be uniquely specified at one time by three independent flow rates.

Rewriting Equation 16 utilizing three of the relationships $$\begin{bmatrix} C_3S \\ C_2S \\ C_3A \\ l \end{bmatrix} = \frac{1}{\xi} \begin{bmatrix} M_{11} & M_{12} & M_{13} & M_{14} \\ M_{21} & M_{22} & M_{23} & M_{24} \\ M_{31} & M_{32} & M_{33} & M_{34} \\ \xi_1 & \xi_2 & \xi_3 & \xi_4 \end{bmatrix} \begin{bmatrix} F_1^* \\ F_2^* \\ F_3^* \\ F_4^* \end{bmatrix} \quad (17)$$

where $$M_{11} = 4.071C_1 - 7.6S_1 - 6.718A_1 - 1.43Fe_1$$
$$M_{21} = -3.071C_1 + 8.6S_1 + 5.068A_1 + 1.079Fe_1$$

etc. Now writing in implicit form;

$$\begin{bmatrix} \epsilon_1 \\ \epsilon_2 \\ \epsilon_3 \\ \epsilon_4 \\ \epsilon_5 \end{bmatrix} = \begin{bmatrix} (C_3S)_0 \\ (C_2S)_0 \\ (C_3A)_0 \\ (C_4AF)_0 \\ l \end{bmatrix} (\xi) - \begin{bmatrix} M_{11} & M_{12} & M_{13} & M_{14} \\ M_{21} & M_{22} & M_{23} & M_{24} \\ M_{31} & M_{32} & M_{33} & M_{34} \\ M_{41} & M_{42} & M_{43} & M_{44} \\ \xi_1 & \xi_2 & \xi_3 & \xi_4 \end{bmatrix} \begin{bmatrix} F_1^* \\ F_2^* \\ F_3^* \\ F_4^* \end{bmatrix}$$

(18)

$$F_i^*{}_{max} \geq F_i^* \geq 0$$

where $(C_3S)_0$, $(C_2S)_0$, $(C_3A)_0$, and $(C_4AF)_0$ are predetermined holding point values for the respective cement compounds.

One of the first four error equations of the set of Equations 18 can be discarded and the remaining errors used to determine driving functions for driving each of the respective error signals to zero. The value for $\xi$ is obtained from the following equation:

$$\frac{d\xi}{dt} = k[1 - (F_1^* + F_2^* + F_3^* + F_4^*)] \quad (19)$$

where $k$ is selected so that the response time for this equation is slow compared with the response time for the solution of Equations 18, this difference in response time is necessary to insure that there is stability in the solution of the Equations 18 and so that that solution will not be affected by the use of the Equation 19 in establishing a value for $\xi$.

Since the flows of the individual feed streams 11-14 will normally not be permitted to go negative or to go positive beyond a fixed limit it will be evident that limiting conditions are present. Considering these limiting conditions, a useful computer technique for determining the driving functions from the respective error signals may be derived by using the method of steepest ascents. The method of steepest ascents is more fully disclosed in Analog Computation in Engineering Design, by Rogers and Connolly, published by McGraw-Hill, 1960. Using this method the driving function may be generally stated $$-\frac{dF_j^*}{dt} = \sum_{i=1}^{n} \beta_i \epsilon_i \frac{\partial \epsilon_i}{\partial F^*_j}\ j = (1, 2, 3, 4) \quad (20)$$

This driving function will always yield a stable solution to the equations and since all of the error signals contribute to each flow correction term, when one or more of the feed streams is limited all of the error signals are still affected by the remaining active flows. This method does in fact minimize the function.

$$\phi = \beta_1 \epsilon_1^2 + \beta_2 \epsilon_2^2 + \beta_3 \epsilon_3^2 + \beta_4 \epsilon_4^2 + \beta_5 \epsilon_5^2 \quad (21)$$

where the $\beta$'s are error weighing factors selected to effect a desired relative minimization of each of the error values. These weighting factors may, for example, be in accordance with the reciprocals of the desired values for the respective cement compounds in the product. Thus, if one or more of the raw feed streams 11-14 is limited by being adjusted to its maximum rate of flow, for example, the sum of the weighted squared errors, $\phi$ will be a minimum although not equal to zero as would be the case if some of the flow rates were at a limit.

By adding a simple linear term, namely $\frac{1}{2}\alpha_j$, which represents the cost of the individual feed streams, the computation can be accomplished with emphasis on the minimization of the cost for the cement product when the respective cement compounds are within a predetermined tolerance. When the cement compounds are necessarily outside that tolerance the computation can be accomplished with emphasis on the minimization of the deviation of the cement compounds in the product from their predetermined holding point values on the basis of a least squares fit. To accomplish this dual purpose we make use of the computer equation $$-\frac{dF^*_j}{dt} = \sum_{i=1}^{n} \beta_i \epsilon_i \frac{\partial \epsilon_i}{\partial F^*_j} + \frac{1}{2}\alpha_j \quad (22)$$

so that the following composite error and cost function will be minimized $$\phi = \sum_{i=1}^{n} \beta_i \epsilon_i^2 + \sum_{j=1}^{m} \alpha_j F^*_j \quad (23)$$

It will be evident from this relationship that for small error signals the cost of the feed material $\alpha$ will dominate the solution while for large error signals the cost of the material will be secondary.

Equation 22 when applied to Equation 18 using the matrix notation provides us with the following relationship $$\frac{d}{dt}\begin{bmatrix} F_1^* \\ F_2^* \\ F_3^* \\ F_4^* \end{bmatrix} = \begin{bmatrix} M_{11} & M_{21} & M_{31} & M_{41} & \xi_1 \\ M_{12} & M_{22} & M_{32} & M_{42} & \xi_2 \\ M_{13} & M_{23} & M_{33} & M_{43} & \xi_3 \\ M_{14} & M_{24} & M_{34} & M_{44} & \xi_4 \end{bmatrix} \begin{bmatrix} \beta_1 \epsilon_1 \\ \beta_2 \epsilon_2 \\ \beta_3 \epsilon_3 \\ \beta_4 \epsilon_4 \\ \beta_5 \epsilon_5 \end{bmatrix} - \frac{1}{2}\begin{bmatrix} \alpha_1 \\ \alpha_2 \\ \alpha_3 \\ \alpha_4 \end{bmatrix} \quad (24)$$

As will be described by the simplified block diagram of the inverse equation computer 136 in FIG. 2, the computer utilizes the relationships of Equation 18, which we may call the process equation, and also the Equation 24, which we may call the driving equation. In addition, the computation of $\xi$ is accomplished by the use of Equation 19. By so solving for $\xi$ it is possible to eliminate the need for a servo or an electronic division as would normally be required. Such an approach therefore simplifies the construction of the inverse equation computer 136. For the purpose of clarity in FIG. 2 the elements 141–144 of FIG. 1 are shown within a phantom line enclosure P to indicate that they are not part of the inverse equation computer 136 of FIG. 1.

Figure 2:
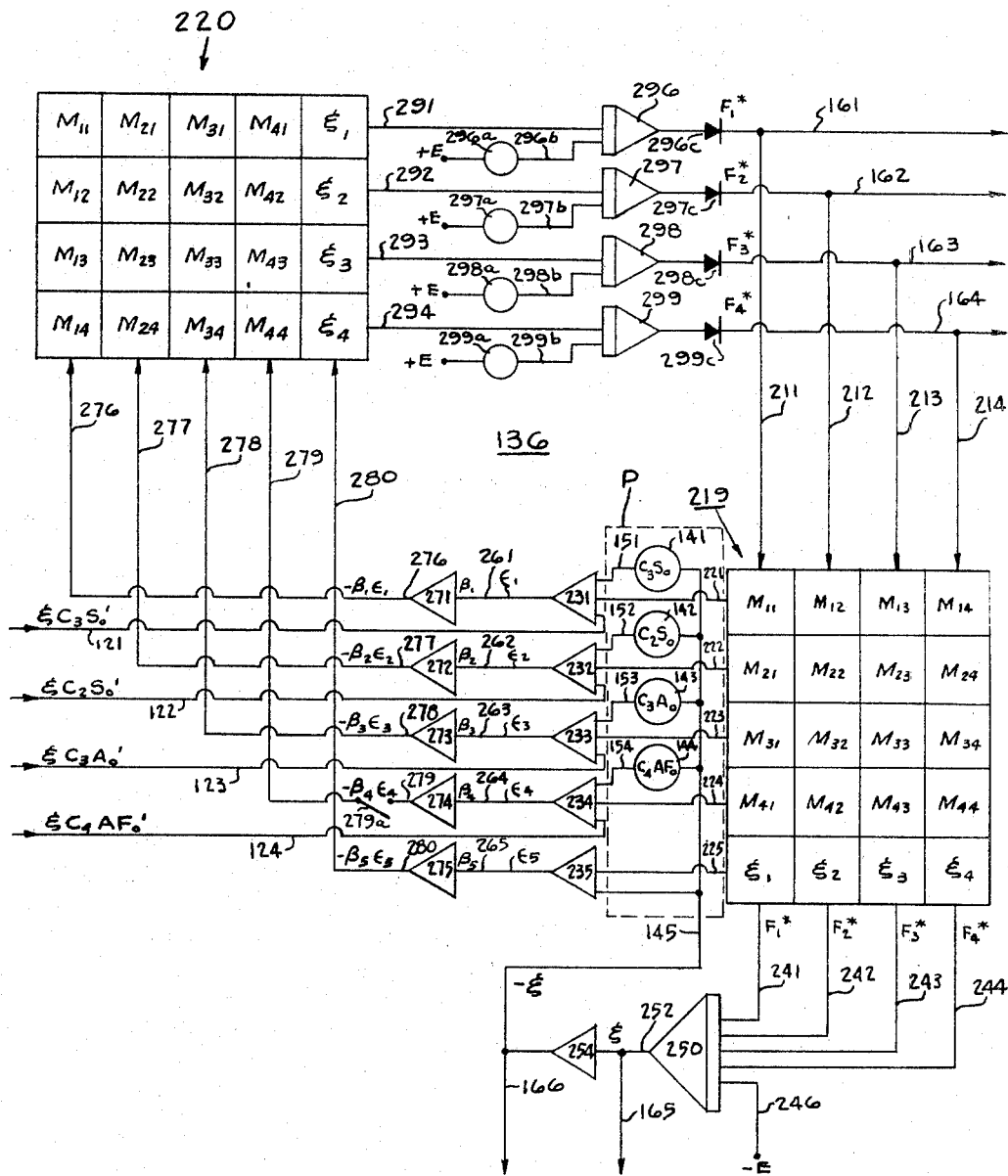
FIG. 2 is a diagrammatic showing of the inverse equation computer of FIG. 1.

Referring now to FIG. 2, which is a block diagram of computer 136 in simplified form showing the method and means for solving the above-mentioned equations, it will be evident that the individual normalized feed rate values $F_1^*$, $F_2^*$, $F_3^*$ and $F_4^*$ can be readily obtained from input values derived from lines 151–154 representing the predetermined holding point values for the cement compounds, and from the feedback control signals on lines 121–124, representing the magnitude of the deviation of individual cement compounds represented by the product collected in product basin 26 of FIG. 1 from the corresponding holding point values. This deviation, as previously explained, is the deviation which has accumulated by the feeding of product into the product basin 26 when the product is not in accordance with the predetermined holding point values for the individual cement compounds which holding point values are represented in FIG. 2 by the settings of the variable potentiometers 141–144.

First, considering the solution of the process Equation 18, it will be evident that the matrix 219 has inputs from lines 161–164 over the lines 211–214 which inputs are respectively representative of the normalized feed rates $F_1^*$, $F_2^*$, $F_3^*$ and $F_4^*$. There will then be produced, as a result of the operation of the matrix elements $M_{11}$–$M_{44}$ and $\xi_1$–$\xi_4$ on the normalized feed rate signals, output signals on the output lines of matrix 219, namely lines 221–224. These output signals respectively represent values for the relative quantity of the cement compounds $C_3S$, $C_2S$, $C_3A$ and $C_4AF$ (on a non-ignited basis) which would be expected as a result of operation of the cement plant with the normalized feed rates as represented by the signals on lines 161–164. Also, there is produced a signal on line 225 representing the non-ignited total of the relative quantities of the above cement compounds.

The signals on lines 221–224 are then compared with the signals on lines 151–154 which connect potentiometers 141–144, respectively, to the operational amplifiers 231–234. In addition, there is an input to the respective amplifiers 231–234 from the lines 121–124, representative of $\xi$ times the deviation of the relative quantity of the cement compounds from their holding point values as modified by the factors introduced by the control 120 (FIG. 1). These modified deviation values are represented by the symbols $(C_3S)_0'$, $(C_2S)_0'$, $(C_3A)_0'$ and $(C_4AF)_0'$. The input signals on lines 121–124 serve as feedback control signals which will alter the outputs of the amplifiers 231–234 to compensate for the deviation of the product in basin 26 (FIG. 1). Thus, the error signal outputs of the amplifiers 231–234, $\epsilon_1$–$\epsilon_4$, are each representative of the deviation of the relative quantities of a particular cement compound expected with the existing flow rates from the predetermined holding point values for those respective cement compounds as modified by feedback control signals indicating the deviation of the product already made.

The holding point values set on potentiometers 141–144 must be converted from values on an ignited basis to values on a non-ignited basis. This is accomplished by multiplying the holding point values as set by a value of $\xi$. This value must be that required to maintain the computed normalized feed rates $F_1^*$–$F_4^*$ to values which in total will equal unity. To accomplish this multiplication, the potentiometers 141–144 are connected to a source of potential on line 145 which is representative of the required value of $\xi$. The required value of $\xi$ is also utilized as an input to amplifier 235 where it is compared with the signal on line 225.

The signal on line 145 is poled so that it represents $-\xi$ as indicated in FIG. 2. This signal is obtained by comparing the sum of the existing computed values for the normalized flow rates $F_1^*$–$F_4^*$ with a potential E representing unity. Thus, the total of the signals on lines 241–244, representing respectively $F_1^*$–$F_4^*$, is compared with a potential $-E$ on line 246 and also integrated by the integrating operational amplifier 250. This operation is described by Equation 19 which when integrated gives $\xi$.

The output of operational amplifier 250 is fed by line 252 to an inverting amplifier 254 which produces an output on line 166 which represents $-\xi$. This output line 166 is also connected to integrator 110 (FIG. 1) and to line 145. The signal representing $\xi$ on line 252 is also connected to integrator 110 (FIG. 1) by way of line 165.

Having shown above with regard to FIG. 2 the manner in which the respective error signals $\epsilon_1$–$\epsilon_5$ are obtained by computation in accordance with Equation 18, there will now be described the manner in which these individual error signals are utilized in a computation utilizing Equation 24 in order to derive the driving functions which will make possible the solution for the individual normalized flow rates $F_1^*$–$F_4^*$.

Each of the error signals $\epsilon_1$–$\epsilon_5$ are fed by way of the respective connecting lines 261–265 as inputs to operational amplifiers 271–275. These operational amplifiers are effective to multiply the error signals $\epsilon_1$–$\epsilon_5$ by weighting factors $\beta_1$–$\beta_5$ to produce on output lines 276–280 the respective weighted error signals $-\beta_1\epsilon_1$–$\beta_5\epsilon_5$. The weighted error signals on lines 276–280 are then fed to a matrix 220 which comprises elements $M_{11}$–$M_{44}$ and $\xi_1$–$\xi_4$. The elements $M_{11}$–$M_{44}$ of matrix 220 are similar to those of matrix 219 and thus have been identified with the same reference characters. As a result of the operation of the matrix elements in matrix 220 on the signals on lines 276–280, there is produced on the output lines of matrix 220, namely lines 291–294, signals which represent the right-hand side of Equation 24 with the exception of the last term which involves the cost factor. For the purpose of minimizing the number of operational amplifiers which are required, the function representing the cost is subtracted from the signals on lines 291–294 and the respective differences are integrated by the operational amplifiers 296–299 to thereby produce on the output lines 161–164 signals representing the respective normalized flow rates $F_1^*$–$F_4^*$. The outputs of the respective amplifiers are connected to lines 161–164 through forwardly poled diodes 296c–299c which limit the output signals to positive values.

The function which introduces the cost factor with respect to each of the four different raw feeds as supplied from bins 1-4 (FIG. 1) is introduced by the potentiometers 296a-299a. A potential source +E across each of these potentiometers causes the potentiometers 296a-299a to produce inputs to amplifiers 296-299 on lines 296b-299b which are representative of the respective quantities $\alpha 1/2$, $\alpha 2/2$, $\alpha 3/2$ and $\alpha 4/2$.

It will be evident from the above description that the integration of the driving function of Equation 24 which integration is accomplished by amplifiers 296-299 serves to drive the solution values of $F_1^*$-$F_4^*$ toward a stable solution.

As will be evident to those skilled in the art, the integrating operational amplifiers 250 and 296-299, as well as the operational amplifiers 231-235, 271-275 and amplifier 254, are all operational amplifiers which may be any of a number of the well-known types presently available and have been shown schematically in FIG. 2 with the omission of their usual input resistors, feedback resistors and ground connections.

In view of the desirability of utilizing only four equations as shown by the set of Equations 24, one of the lines 276-279 may be disconnected as by a switch 279a which is shown open in FIG. 2. When this switch is open there is utilized only the weighted error signals on lines 276-278 as well as the weighted error signal on line 280 for the solution of Equation 24.

Figure 3:
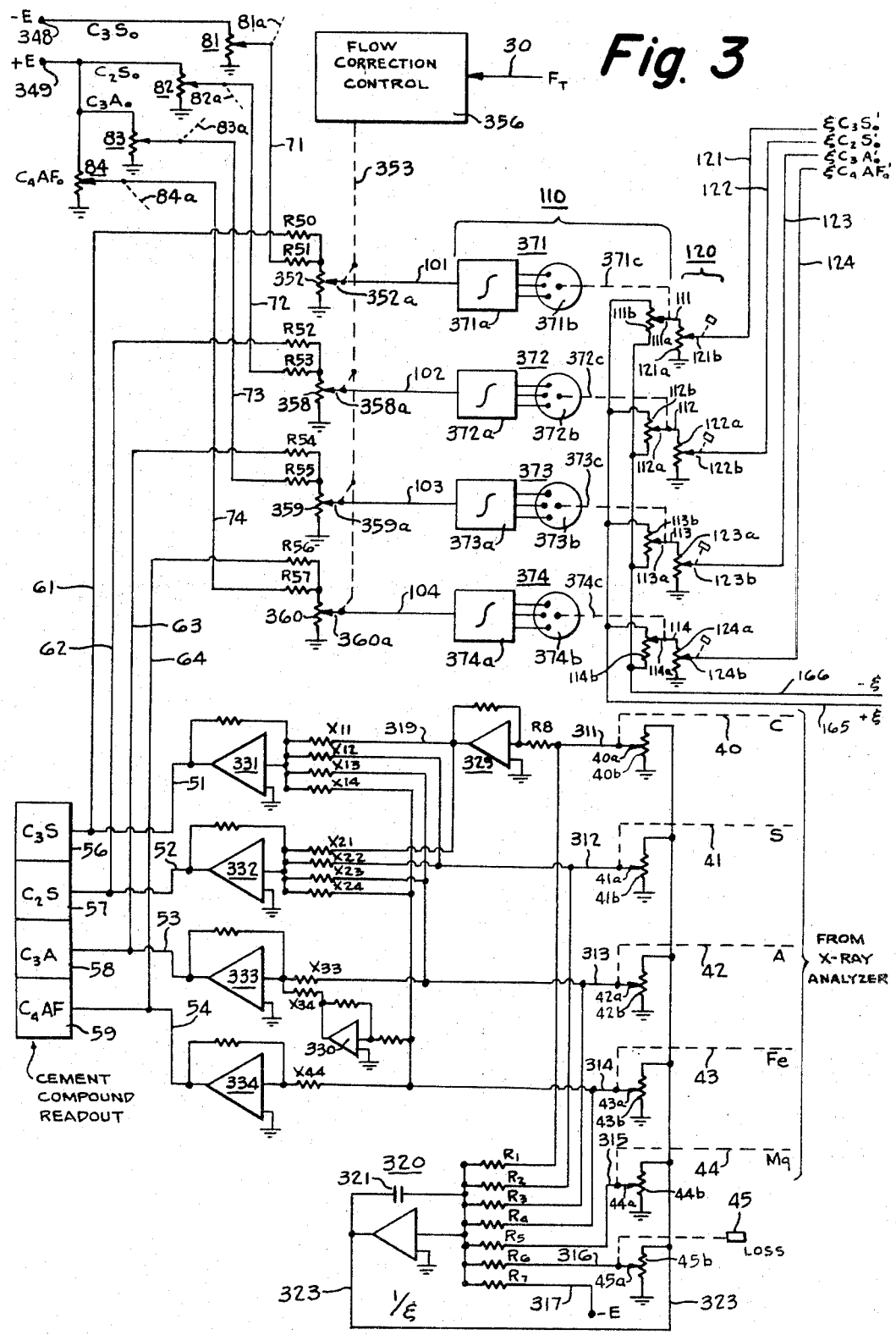
FIG. 3 is a more detailed diagrammatic showing of that part of the control system of FIG. 1 which excludes the inverse equation computer.
Figure 4:
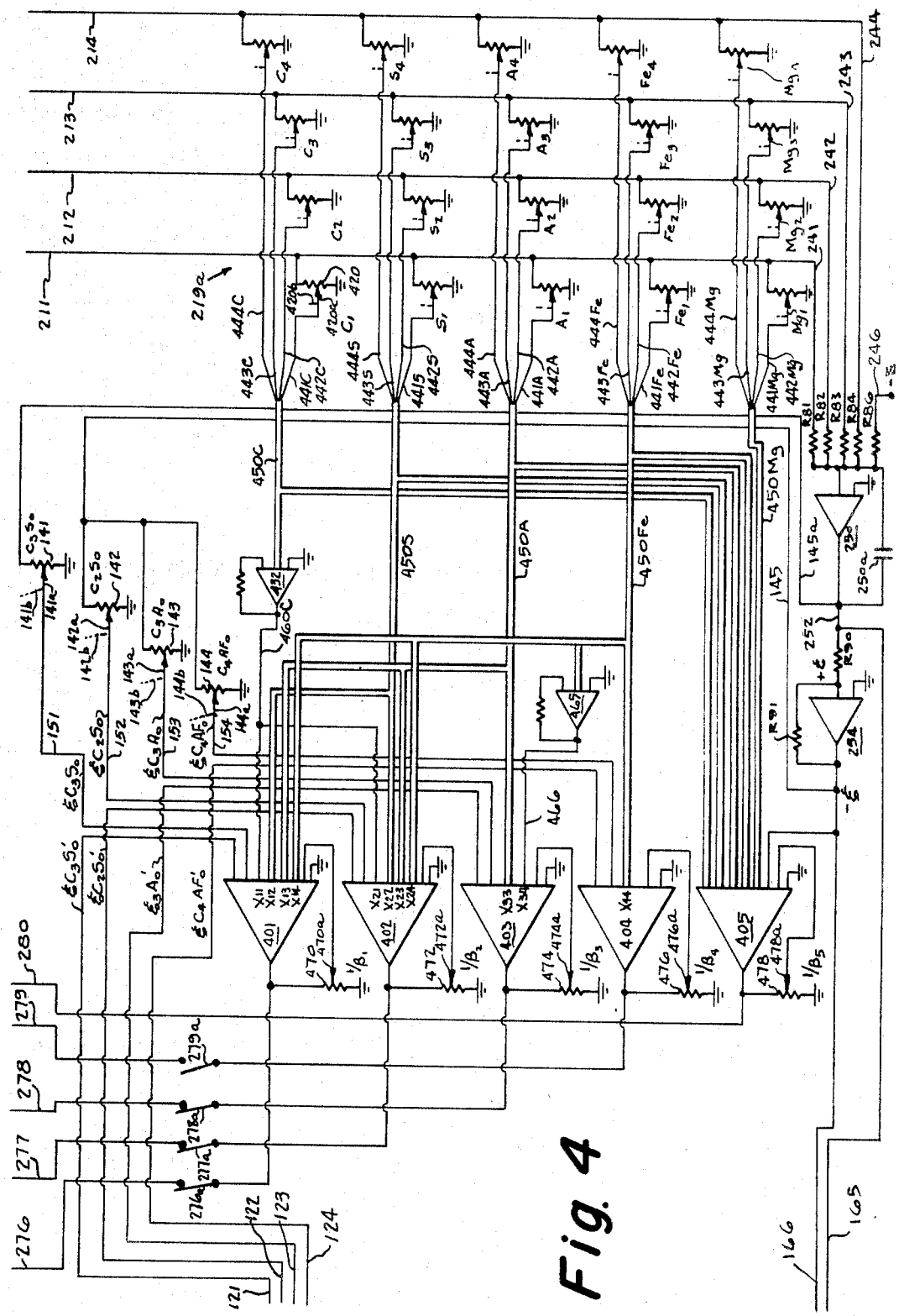
FIG. 4 is a more detailed diagrammatic showing of that part of the inverse equation computer which is shown in the lower half of FIG. 2.
Figure 5:
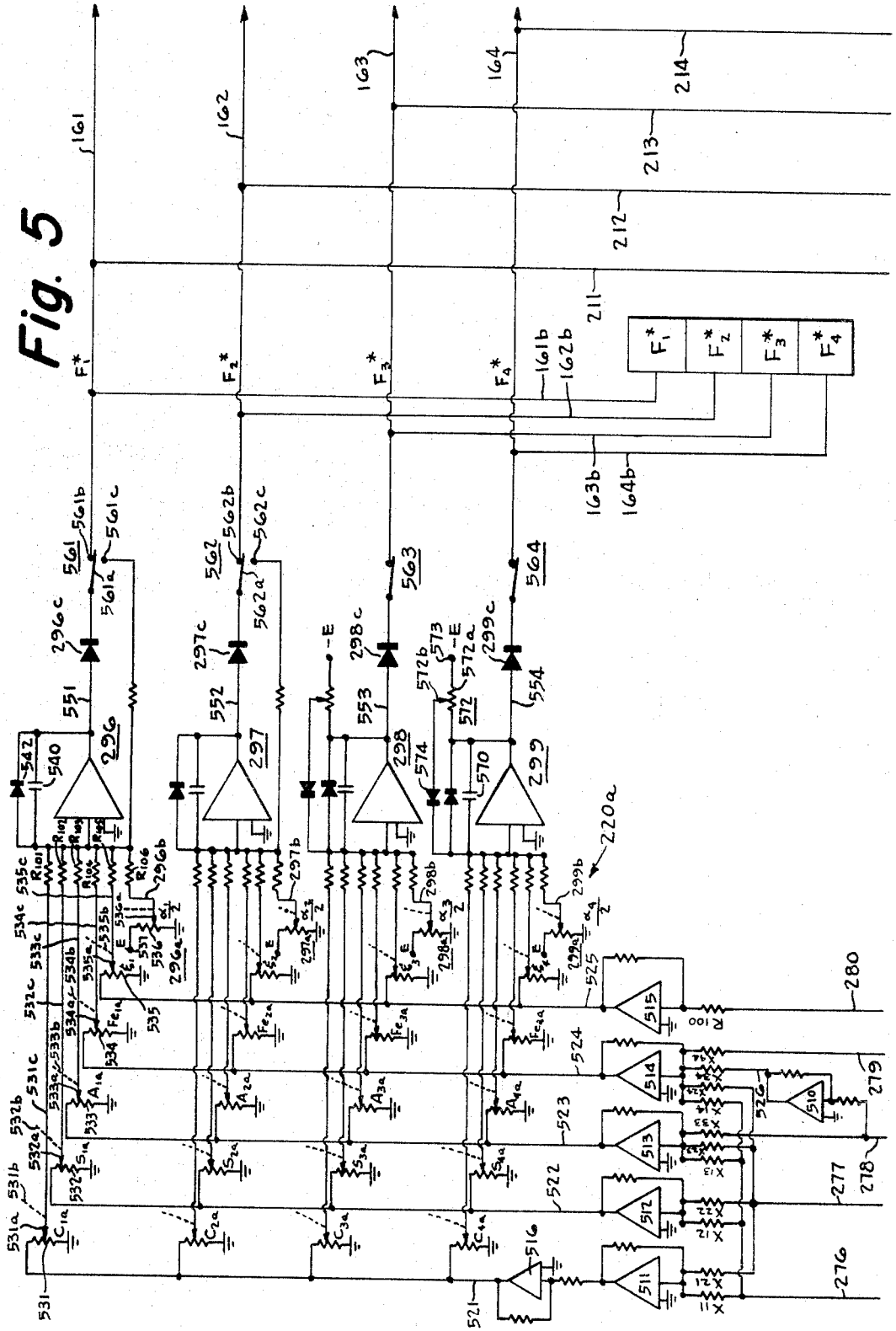
FIG. 5 is a more detailed diagrammatic showing of the portion of the inverse equation computer shown in the upper half of FIG. 2.

Further details with regard to the individual elements of FIGS. 1 and 2 and the manner in which they operate to effect the computation generally described above, will be clear from the following description of FIGS. 3-5 which taken together show in detail a preferred circuit arrangement for computing the values $F_1^*$-$F^*_4$. FIGS. 4 and 5 show the detailed circuitry for the inverse equation computer 136 while FIG. 3 shows the remaining portion of the overall computer 10 (FIG. 1).

As pointed out previously, X-ray analyzer 36 (FIG. 1) produces positions for the respective output shafts 40-44 which positions each represent the relative quantity of an individual one of the constituent oxides to be found in the raw feed material analyzed in sampler 24 (FIG. 1). As shown in FIG. 3, the shafts 40-44 are effective to position their respective contacts 40a-44a along the corresponding slidewires 40b-44b. These contact positions thus represent the relative values of the respective oxides in percentage by weight on a non-ignited basis. In addition, there is utilized a manually adjusted contact 45a which is adjusted as by the manual knob 45 to position the contact 45a along the slidewire 45b in accordance with the loss quantity L which represents the inert material of the blended stream 22 (FIG. 1) in percentage by weight on a non-ignited basis. Thus, the entire amount of the non-volatile material fed in the raw feed stream 22 is represented by the positioning of the contacts 40a-45a.

The sum of the signals which are produced on lines 311-316 by the respective contacts 40a-45a is compared with a signal representing unity, which signal is produced on line 317 by a potential $-E$ connected to terminal 318. The differences resulting from the comparison is integrated by operational amplifier 320 which is shown as comprising separate input resistors $R_1$-$R_7$ for each of the input signals as derived from lines 311-317. The amplifier also includes a capacitor 321 in the feedback circuit of the amplifier to provide the integrating operation. As a result of the comparison and integration carried out by amplifier 320, there is produced on the output line 323 of amplifier 320 a potential representative of the quantity $1/\xi$. Line 323 is connected as a potential source to one end of each of the slidewires 40b-45b which have their other end connected to a ground connection. Therefore the signals which are presented on lines 311-315 represent the relative amounts of the individual constituent oxides of the raw feed on a burned or ignited basis, that is on the basis of the relative amounts of these oxides which will enter into the actual final cement products. Thus, there is taken into account the fact that some material is driven off by the burning process. The signal on line 316, of course, represents the inert material on a burned basis.

In order to convert the signals on line 311-314 which represent the constituent oxides of the blended raw feed material into signals representing the constituent cement compound expected in the final cement product, there is utilized in FIG. 3 the operational amplifiers 329-334 which amplifiers serve to carry out the solution of Equation 14. For example, amplifier 331 provides a solution for the first of the Equations 14. The respective multiplying factors for the terms on the right-hand side of the Equations 14 are represented by the relative magnitudes of the input resistors $X_{11}$-$X_{44}$. The input resistors for operational amplifier 331 are $X_{11}$, $X_{12}$, $X_{13}$ and $X_{14}$ which are connected respectively to lines 311-314. The connection to line 311 is by way of sign changing amplifier 329 and its input resistor $R_8$ and line 319. Thus, the output signal on line 51 from amplifier 331 represents the cement compound $C_3S$ on a burned or ignited basis.

Amplifiers 332-334 similarly produce the solutions on lines 52-54 of the second, third and fourth equations of the set 14. To this end amplifier 332 has input resistors $X_{21}$, $X_{22}$, $X_{23}$ and $X_{24}$ each of which represent a multiplying factor for a term in the second of the Equtaions 14. These resistors are connected to receive the input signals from lines 319 and 312-314, respectively. Likewise, amplifier 333 has input resistors $X_{33}$ and $X_{34}$ which represent the relative values of the constants in the third of the Equations 14. The resistors $X_{33}$ and $X_{34}$ are connected to receive input signals from lines 313 and 314, respectively. The signal from line 314 is obtained by way of sign changing amplifier 330. Amplifier 334 has as an input resistor $X_{44}$ representing the constants appearing in the fourth equation of group 14.

Each of the amplifiers 329-334 is shown as having not only the normal input resistors but also the usual feedback resistors and the ground connections.

As previously mentioned, the signals on lines 51-54 represent the four constituent cement compounds in the cement product on a burned basis and these signals are utilized in the indicators 56-59, respectively, to produce indications which may be utilized by the operator in order to monitor the operation.

As explained in the description of FIG. 1, the signals on lines 51-54 are by means of connection through the respective lines 61-64 compared with the signals on lines 71-74 which represent the desired holding point values for the individual cement compounds $C_3S$, $C_2S$, $C_3A$ and $C_4AF$. This comparison is shown in FIG. 1 as being carried out by the comparison means 66-69. In FIG. 1 it is also shown that the outputs of the comparison means 66-69 feed, through line 91-94, a flow correction device 96. In FIG. 3 both the comparison and the flow correction are carried out by the resistors $R_{50}$-$R_{57}$ and their associated potentiometers 352, 358, 359 and 360.

It will be evident from FIG. 3 that the individual desired holding points for the cement compounds are represented by the outputs on lines 71-74 of manually adjusted potentiometers 81-84 which are adjusted through their mechanical coupling 81a-84a by the manually adjusted knobs 86-89, respectively, of FIG. 1. The potentiometer 81 is supplied by a potential source $-E$ at terminal 348 while the other potentiometers 82-84 are supplied by a potential source $+E$ at terminal 349.

The comparison of each of the signals on lines 71-74 with the corresponding signals on lines 61-64, respectively, is accomplished by resistors $R_{50}$-$R_{57}$. For example, $R_{50}$ is connected to line 61 while $R_{51}$ is connected to line 71. The other ends of resistors $R_{50}$ and $R_{51}$ are then connected to one end of variable potentiometer 352 which has a movable tap 352a adjusted by the mechanical connection 353 from a flow correction device 356. The other end of the potentiometer 352 is connected to ground and thus the signal on line 101 is modified in accordance with the adjustment of the position of the contact 352a. This adjustment of contact 352a as well as the contacts 358a–360a on the respective potentiometers 358–360 is accomplished in accordance with some proportional factor times the total flow signal Ft of the raw feed material as supplied to the flow correction device 356 on line 30. There is thus accomplished by the flow correction device 356 a correction of the signals on lines 101–104 taking into account the existing total flow of the raw feed material. Flow correction device 356 may be any of a number of common control devices having a mechanical shaft output which is related by predetermined factors to an electrical input.

The respective lines 101–104 connect to the integrating devices 371–374. Each of these integrating devices may comprise an electronic circuit adapted to operate a motor so that there can be established on an output shaft of the motor a position indicative of the integral of the input signal to the electronic circuit. The integrating devices 371–374 include the corresponding electronic circuits 371a–374a and motors 371b–374b. The outputs of the motors 371b–374b by means of shafts 371c–374c which are respectively coupled to the movable contacts 111a–114a produce on lines 111–114 signals representing the accumulated deviations of the expected cement product from the desired holding point values as determined by the deviation of the product basin 26 (FIG. 1). These particular deviation signals are converted to an unburned basis by utilizing as a supply for the potentiometers 111b–114b the potentials appearing on lines 165–166. These potentials represent respectively $+\xi$ and $-\xi$, thus each of the potentiometers 111b–114b has one end at a potential $+\xi$ and the other end at a potential $-\xi$, to accommodate the positive and negative excursions of the integrated deviation signals.

The signals on lines 111–114 are then fed to a control device 120 (FIG. 1) which in FIG. 3 consists of a potentiometer connected between each of those lines and ground. These potentiometers are shown in FIG. 3 as potentiometers 121a–124a each of which has its respective variable tap 121b–124b manually adjusted to maintain the tap at a position representing a particular constant representing a proportional control factor. Other control functions may be utilized but no other control function is shown in this embodiment.

The variable contacts 121b–124b are respectively connected to the lines 121–124 which thus will carry signals representing the feedback control signal to be utilized in the correction of the deviations of the respective cement compounds expected from the mix presently in the product basin 26 (FIG. 1). As shown in FIG. 1, lines 121–124 are input lines to the inverse equation computer 136 and respectively carry signals representing the quantities $\xi(C_3S)_0'$, $\xi(C_2S)_0'$, $\xi(C_3A)_0'$ and $\xi(C_4A)_0'$. The elements of the inverse equation computer 136 are shown in greater detail and will be described now in connection with FIGS. 4 and 5.

In considering FIG. 4, it will be helpful to follow the signals by starting with those which appear on lines 211–214 in order to illustrate the manner in which the elements of FIG. 4 serve to effect a computation in accordance with Equation 18. Lines 211–214 as described in connection with FIG. 2 carry signals indicative of the normalized values of the feed rates $F_1^*$–$F_4^*$, respectively.

As was previously pointed out, the elements $M_{11}$–$M_{44}$ of the matrix 219 is FIG. 2 will each include a group of elements. In the circuit of FIG. 4, for the purpose of conserving on the number of amplifiers required, the operation accomplished by the amplifiers 231–235 (FIG. 2) as well as the operation carried out by the amplifiers 271–275 (FIG. 2) and part of the operation of the individual matrix elements is accomplished in FIG. 4 by amplifiers 401–405 which are operational amplifiers which, as mentioned, may be of any of a number of well-known types. Amplifiers 432 and 465 are included for correcting the signs.

The matrix 219 of FIG. 2 being a product of the cement compound matrix of Equation 15 and the oxide matrix of Equation 11 can be best described with reference to the functions of these two matrices which it represents. Thus, we have in FIG. 4 group of variable potentiometers $C_1$–$C_4$, $S_1$–$S_4$, $A_1$–$A_4$, $Fe_1$–$Fe_4$ and $Mg_1$–$Mg_4$, each of which has a variable tap manually adjusted in accordance with an analysis of the relative amounts of the constituent oxides of the raw feed material in each of the bins 1–4 (FIG. 1). Thus, each of these variably adjusted potentiometers serves to modify a corresponding one of the signals on the lines 211–214 in accordance with the oxide composition in the particular one of the raw feed streams represented by the feed signals on 211–214.

For illustration purposes it will be evident by reference to FIG. 4 that the potentiometer $C_1$ is comprised of a slidewire 420 having a variable contact 420a which is moved by mechanical coupling 420b forming a part of the mechanical input 160 (FIG. 1) so that the position of the contact 420a on the resistor 420 represents the percent by weight on a non-ignited basis of one constituent oxide, namely calcium oxide, in the feed stored in bin 1 (FIG. 1). There is thus produced on line 441C which connects to contact 420a a signal which represents the quantity $C_1F_1^*$. Similarly, by means of potentiometers $C_2$, $C_3$ and $C_4$, there is produced on each of the respective lines 442C–444C signals which represent the quantities $C_2F_2^*$, $C_3F_3^*$ and $C_4F_4^*$.

The individual lines 441C–444C are shown as being fed by a cable 450c which cable connects to operational amplifier 432 and has a branch connecting to amplifier 405.

Each of the potentiometers $S_1$–$S_4$ serves to produce, in similar fashion, signals on lines 441S–444S representing respectively the quantities $S_1F_1^*$, $S_2F_2^*$, $S_3F_3^*$ and $S_4F_4^*$. Lines 441S–444S form cable 450S.

In like manner the potentiometers $A_1$–$A_4$, $Fe_1$–$Fe_4$ and $Mg_1$–$Mg_4$ each produce a separate signal. The respective four signals produced by the potentiometers $A_1$–$A_4$ appear on lines 441A–444A which make up the cable for 450A.

The potentiometers $Fe_1$–$Fe_4$ similarly produce signals on lines 441Fe–444Fe which together form cable 450Fe. In like manner the potentiometers $Mg_1$–$Mg_4$ produce signals on lines 441Mg–444Mg which are combined into a cable 450Mg.

Operational amplifier 432 is effective to sum up the signals on the lines 441C–444C to produce on line 460c a signal corresponding to quantity C in Equation 11. Similarly, amplifier 465 is effective to produce on line 466 a signal corresponding to quantity C in Equation 11. Simi-lines 441Fe–444Fe which thus corresponds to the quantity Fe of Equation 11.

All of the remaining operations involving the summation of the rows of the oxide matrix, the multiplication by the cement compound chemical composition matrix [CC] and the comparison of the results from multiplying those two matrices and comparing the resulting values with the signal on lines 151–154 representing predetermined holding point values and also the modification by the signals on lines 121–124 are carried out by amplifiers 401–405. The amplifiers 401–405 are not shown with input resistors for convenience of drawing. Instead, it may be assumed that the relative values of the input resistors are in accordance with the multiplication factor represented by the $X_{11}$–$X_{44}$ which appear adjacent the individual cables and lines which constitute the inputs to the amplifiers 401–405. Where no notation is made it may be assumed that the input resistors have values representing a multiplying factor of one. Thus, amplifier 401 has input signals from lines 121, 151, 460C, cable 450S, cable 450A and cable 450Fe through input resistors as follows:

$X_{11}$ for line 460C
$X_{12}$ for cable 450S
$X_{13}$ for cable 450A
$X_{14}$ for cable 450Fe The multiplying factors represented by these input resistors correspond with the factors for the several terms in the first equation of the set of Equations 14 thus:

$$X_{11}=4.071$$
$$X_{12}=7.6$$
$$X_{13}=6.718$$
$$X_{14}=1.43$$

In amplifier 401 a multiplication by $\beta_1$ is carried out by modifying the feedback circuit for the amplifier. This is accomplished through the use of potentiometer slidewire 470 and its associated contact 470a which form the feedback path for amplifier 401. There is thus produced on line 276 as an output from amplifier 401 a signal representing $\beta_1\epsilon_1$.

The produce the signal $\beta_2\epsilon_2$, amplifier 402 utilizes inputs from lines 122, 152, 460C, cable 450S, cable 450A and cable 450Fe, the input resistors being respectively $X_{21}$ for line 460C
$X_{22}$ for cable 450S
$X_{23}$ for cable 450A
$X_{24}$ for cable 450Fe and these inputs resistors represent the respective multipliers shown as factors in the second equation of the set of Equations 14. Thus $$X_{21}=3.071$$
$$X_{22}=8.6$$
$$X_{23}=5.068$$
$$X_{24}=1.079$$

Amplifier 402 has a similar feedback circuit to that of 401 in that it utilizes potentiometer slidewire 472 with its variable contact 472a as a feedback path which serves to modify the output signal from amplifier 402 by the factor $\beta_2$ to produce on line 277 the output signal $\beta_2\epsilon_2$.

Amplifier 403 which has inputs from lines 123, 153, cable 450A and line 466 has input resistors $X_{33}$ for cable 450A and $X_{34}$ for line 466 where these separate resistors have values as follows:

$$X_{33}=2.65$$
$$X_{34}=1.692$$

These values are the factors of the terms of the third equation of the set of Equations 14. Amplifier 403 also includes a potentiometer slidewire 474 with its variable contact 474a which make up a feedback path for the amplifier 403 so as to modify the output signal by a factor $\beta_3$ and thereby produce on output line 278 a signal representative of $\beta_3\epsilon_3$.

Similarly, amplifier 404 has inputs from lines 124, 154 and cable 450Fe. The input resistors for the lines in cable 450Fe are indicated as $X_{44}$ which has a value representing the multiplying factor 3.043. This value is, of course, the factor shown in the fourth equation of the set of Equations 14. Amplifier 404 also includes as a feedback path the potentiometer slidewire 476 with its contact 476a which serves to modify a factor $\beta_4$ the output signal of amplifier 404 so that there is produced on line 279 a signal representative of the value $\beta_4\epsilon_4$.

Amplifier 405 has inputs from cables 450C, 450S, 450A, 450Fe and 450Mg as well as line 166. As indicated by the absence of any notations for the input resistors in the amplifier 405, those resistors have the same values. Thus, amplifier 405 is operative to sum the product of the computed normalized flow rates $F_1^*$–$F_4^*$ and the relative quantities of each oxide associated with each of the feed streams to obtain $\xi$. This approach differs from that shown in FIG. 2 and can be derived from a combination of Equations 9 and 12 with the omission of the $L_i$ terms which are extremely small in magnitude. Amplifier 405 also has a feedback potentiometer slidewire 478 with a contact 478a which together make up the feedback path for amplifier 405 and serve to modify the output signal by a factor $\beta_5$ to produce on the output line 280 of the amplifier 405 a signal $\beta_5\epsilon_5$.

It will be evident that the quantities $\xi$ and $-\xi$ are produced in FIG. 4 in a manner similar to that shown in FIG. 2, in that the lines 241–244 and 246 supply inputs to amplifier 250 through the input resistors $R_{81}$–$R_{84}$ and $R_{86}$, which resistors may all have the same value. The amplifier 250 is shown as having a capacitor 250a in its feedback circuit. The output of amplifier 250 is connected through line 252 and input resistor $R_{90}$ to amplifier 254. Amplifier 254 has a feedback resistor $R_{91}$. The function of amplifier 254 is to change the polarity of the signal so that its output line 166 carries the signal representing $-\xi$. Line 166 is coupled by line 145 to the potentiometer slidewires 142–144, each of which has an associated movable contact 142a–144a which is movable by corresponding mechanical connections 142b–144b which are in turn connected to the manually adjustable knobs 86–89 (FIG. 1) so that the signals produced on lines 152–154 represent respectively the predetermined desired holding point values of the cement compounds $C_2S$, $C_3A$ and $C_4AF$ which holding point values are designated as $(C_2S)_0$, $(C_3A)_0$ and $(C_4AF)_0$. These holding point values are thus modified by multiplication by the term $-\xi$ in order to put them on an unburned or un-ignited basis.

Line 252 is connected through line 145a to potentiometer slidewire 141 which by way of its movable contact 141a produces a signal on line 151 corresponding to a value $\xi$ times $(C_3S)_0$ which represents the holding point value for the compound $C_3S$ on an unburned basis. The adjustable contact 141a is adjusted as by the manually set knob 86 (FIG. 1) through the mechanical coupling 141b.

The weighted error signals $-\beta_1\epsilon_1$–$\beta_5\epsilon_5$, which appear respectively as signals on lines 276–280, are signals in terms of the error or deviation of the cement compounds which would be expected to result from the existing feed rates $F_1^*$–$F_4^*$. In order to effect a change in the feed rates $F_1^*$–$F_4^*$ to reduce the above mentioned weighted error signals to zero or to an optimum value, as previously discussed, a driving function of the type described by the Equations 24 is utilized. The elements to effect this change in the feed rates are shown in detail in FIG. 5.

The lines 276–279 include serially connected switches 276a–279a, one of which is preferably open. For example, in FIG. 4 the switch 279a is shown in an open state whereas the switches 276a–278a are all shown as being closed. The other side of the switches 276a–279a connects through lines 276–279 with similar lines in FIG. 5, as does the line 280.

In FIG. 5 the operational amplifiers 510–516 serve to convert the weighted error signals on lines 276–280 into intermediate signals. The potentiometers $C_{1a}$–$C_{4a}$, $S_{1a}$–$S_{4a}$, $A_{1a}$–$A_{4a}$, $Fe_{1a}$–$Fe_{4a}$ and $\xi_1$–$\xi_4$ in addition to the operational amplifiers 296–299 and their associated components, convert the intermediate signals into normalized feed rate signals $F_1^*$–$F_4^*$ as will be hereinafter described.

It will thus be evident that the matrix elements $M_{11}$–$M_{44}$ and $\xi_1$–$\xi_4$ shown as making up the matrix 220 of FIG. 2, each include a plurality of elements. As will be evident, the amplifiers 511–515, the adjustable potentiometers $C_{1a}$–$C_{4a}$, $S_{1a}$–$S_{4a}$, $A_{1a}$–$A_{4a}$, $Fe_{1a}$–$Fe_{4a}$ and $\xi_1$–$\xi_4$ and the amplifiers 296–299 all taken together perform the operations of the matrix 220 of FIG. 2 as well as those operations shown as being accomplished by the amplifiers 296–299 in FIG. 2. For the purpose of conserving the number of operation amplifiers required, the integrating amplifiers 296–299 are also used for the purpose of summing up the outputs of the related matrix elements.

In FIG. 5 the signal on line 521 is derived from the input signals from lines 276 and 277 which are respectively introduced by way of the input resistors $X_{11}$ and $X_{21}$ to amplifier 511 whose output passes through sign changing amplifier 516.

The similar signal on line 522 is derived from the output of amplifier 512 whose inputs are from ilnes 276 and 277 through input resistors $X_{12}$ and $X_{22}$, respectively.

In similar fashion the signal on line 523 is derived as an output from amplifier 513 whose input signals are from lines 276, 277 and 278 to the respective input resistors $X_{13}$, $X_{23}$ and $X_{33}$.

The signal supplied to line 524 from amplifier 514 is derived from input signals from lines 276, 277, 526 and 279 which are respectively fed to the amplifier 514 through the input resistors $X_{14}$, $X_{24}$, $X_{34}$ and $X_{44}$. Another intermediate signal is also supplied on line 525 as an output from amplifier 515. This signal is similar to that on line 280 which is the input line to amplifier 515 except that the polarity of the output will be different than the input. The input resistor $R_{100}$ is such as to introduce no multiplication factor whereas the resistors $X_{11}$–$X_{44}$ all introduce the same multiplication factors associated with them in those parts of the circuits previously described in FIGS. 3 and 4 and indicated by the same reference characters.

As will be evident from FIG. 5, the signal on line 521 supplies the potential across each of the respective potentiometers $C_{1a}$–$C_{4a}$, the signal on line 522 provides the potential across each of the respective potentiometers $S_{1a}$–$S_{4a}$, the signal on line 523 provides potentiometers across each of the respective potentiometers $A_{1a}$–$A_{4a}$ while the signal on the line 524 provides the potential across each of the potentiometers $Fe_{1a}$–$Fe_{4a}$ and that signal appearing on the ilne 525 provides the potential across the respective potentiometrs $\xi_1$–$\xi_4$. It will also be evident from FIG. 5 that the outputs from the variable taps on each group of potentiometers having the same subscript number are summed by means of the respective amplifiers 296–299 and at the same time the result is integrated to derive the corresponding normalized feed rate value $F_1^*$–$F_4^*$.

Because of the similarity of the manner in which each of these feed rate signals are derived, it will be sufficient to describe in detail two of the circuits which are representative. For example, the signal $F_1^*$ is derived by the summation and integration of the outputs of the respective potentiometer $C_{1a}$, $S_{1a}$, $A_{1a}$, $Fe_{1a}$ and $\xi_1$. To this end the potentiometer $C_{1a}$ having a slidewire 531 with a variable tap 531a adjusted by the mechanical coupling 531b provides on line 531c a signal indicative of the product of the quantity $C_1$ times the signal on line 521. Similarly, the potentiometers $S_{1a}$, $A_{1a}$, $Fe_{1a}$ and $\xi_1$ include their respective slidewires 532–535 in contact with the respective adjustable taps 532a–535a, each of which is adjusted by its corresponding mechanical coupling 532b–535b to produce signals on lines 532c–535c representing the respective products of the quantities $S_1$, $A_1$, $Fe_1$ and $\xi_1$ times the signals on the corresponding lines 522–525. The mechanical couplings 531b–535b form part of the mechanical input 160 (FIG. 1). For practical purposes the potentiometers $C_{1a}$–$C_{4a}$, $S_{1a}$–$S_{4a}$, $A_{1a}$–$A_{4a}$, $Fe_{1a}$–$Fe_{4a}$ may be ganged with the respective potentiometers $C_1$–$C_4$, $S_1$–$S_4$, $A_1$–$A_4$, and $Fe_1$–$Fe_4$.

Each of the signals 531c–535c is introduced as an input to amplifier 296 by way of one of the input resistors $R_{101}$–$R_{105}$, all of which are the same value. In order to add to the sum of the signals introduced from lines 531c–535c a signal representative of the quantity $\alpha 1/2$ is introduced by way of the input from line 296b. This signal is provided by the adjustment of the variable tap 536a on the potentiometer slidewire 536 of potentiometer 296a. A potential source E is connected to terminal 537 of slidewire 536 to provide a potential supply. The manual adjustment of the variable tap 536a is made in accordance with the cost factor associated with the feed stream $F_1$ as previously described. Thus, the cost factor is introduced from line 296b by way of input resistor $R_{106}$ to amplifier 296. The amplifier 296 then sums the inputs from lines 531c–535c, subtracts the input from line 296b and integrates the result by means of the capacitor 540 in the feedback circuit of amplifier 296.

The output from amplifier 296 on line 551 is passed through a serially connected diode 296c whose purpose is to prevent the output signal on line 161 from going negative for, as has been previously pointed out, the flow of the various feed streams must always be of a positive value, there being no physical significance to flow quantities of a negative value.

In addition, a reversely poled diode 542 is utilized across the feedback capacitor 540 to prevent an overloading of the amplifier 296 when diode 296c is not conducting. Also connected in series between line 551 and line 161, is a feed selector switch 561 which has a movable switch blade 561a which is maintained in contact with the fixed contact 561b whenever feed stream 11 (FIG. 1) is a feed stream which has been selected to be utilized in the cement mixing process. The switch 561 is shown in the "on" position. When the switch blade 561a is moved to contact the contact 561c, the switch is in the "off" position and the resistor 561d is inserted across the amplifier 296 to provide a means which discharges the capacitor 540 and prevents an overloading of amplifier 296.

In the particular application here described, it is desired to limit the rate of feed in certain of the feed streams, for example, in the illustrated circuits the feed stream 13 and 14 (FIG. 1) are limited. This limiting effect is accomplished for feed stream 14, for example, by the introduction across the feedback capacitor 570 of amplifier 299 of a circuit which includes a variable negative voltage established by a potentiometer 572 which voltage is connected through a reversely poled diode 574 to the input of amplifier 299. By means of this modification of the feedback circuit of the amplifier there is established a limiting potential for the output line 554 in accordance with the adjustment of the variable tap 572b on the slidewire 572a of potentiometer 572. As shown in FIG. 5, the potentiometer is supplied by a potential source —E connected to terminal 573 on the opposite end of slidewire 572a from its connection to line 554. By the mechanical or manual adjustment of the contact 572b the feed rate of the feed stream $F_4^*$, for example, may be limited to a valve such as 10% of the maximum total flow $Ft$. It is desired, of course, to modify the setting of contact 572b as the total feed rate $Ft$ is modified to values below its maximum value.

It will be evident from FIG. 5 that the feed stream selector switch 564 does not require an "off" position to place a resistor across the feedback capacitor 570 for the prevention of overloading for potentiometer 572 and diode 574 serve this purpose.

As shown in FIG. 5, the circuit associated with amplifier 298 is similar to that associated with amplifier 299 so that there is produced on line 553 a signal which after being fed through the diode 298c and the closed selector switch 563 to line 163 represents $F_3^*$.

It will also be evident in FIG. 5 that the circuitry associated with amplifier 297 is similar to that associated with amplifier 296 so that there is produced on line 552 a signal, which after being fed through the diode 297c and the closed selector switch 562 by way of the switch blade 562a and the "on" contact 562b to line 162, represents the normalized feed rate $R_2^*$.

In FIGS. 4 and 5, corresponding elements of the matrices 219a and 220a are adjusted simultaneously. For example, the mechanical connections to the potentiometers $C_1$–$C_4$ are connected to operate simultaneously with the change in position of the variable taps on the potentiometers $C_{1a}$–$C_{4a}$, respectively. These mechanical interconnections are not shown in FIG. 5.

It will be evident from FIGS. 4 and 5 that potentiometers $S_1$–$S_4$, $A_1$–$A_4$ and $Fe_1$–$Fe_4$ are likewise operated simultaneously with art adjustment of similar potentiometers $S_{1a}$–$S_{4a}$, $A_{1a}$–$A_{4a}$ and $Fe_{1a}$–$Fe_{4a}$. These adjustments are, of course, normally made by manually adjustable knobs not shown. The other potentiometers in the matrices, namely $Mg_1$–$Mg_4$ and $\xi_1$ and $\xi_4$, are individually adjusted by their own separate adjustable knobs not shown. The adjustment of the potentiometers $\xi_1-\xi_4$ are made in accordance with estimated values, for estimated values are sufficiently accurate for the purposes of this apparatus.

The variable taps 141a–144a on the potentiometer slide-wires 141–144 are adjusted by their respective mechanical couplings 141b–144b which are respectively connected to the mechanical couplings 81a–84a, for the quantities to be set thereby are related to the individual desired holding point values for the cement compounds. As shown in FIG. 1, the knobs 86–89 are utilized for making these mechanical adjustments.

In the above description of the operation of the apparatus of FIGS 4 and 5, it has been assumed that one of the switches 276a–279a is open while the others are maintained in a closed condition. Such an arrangement is desirable in order to allow the computer apparatus of FIGS. 4 and 5 to so operate as to reduce the weighted error signals appearing on lines 276–280 to zero when the corresponding normalized feed rates $F_1^*$–$F_4^*$ are all possible values for the feed rate through the feed streams 11–14 (FIG. 1). In the situation where the ideal mixture or blending of the rock from the several bins 1–4 (FIG. 1) is not possible, for example, when a particular type of rock is not available or in the situation where one of the feed streams is temporarily clogged, a minimization of the weighted error signals appearing on lines 276–280 can still be obtained even if all of the switches 276a–279a are in a closed condition. Such an arrangement obviously uses more variables for solving the problem than is necessary, but it would nevertheless operate to minimize the weighted error signals.

The feed stream selector switches 561–564 are provided so that the operator will have the ability to select any number of the available feed streams for the blending operation. Thus, if the operator should desire that the blend be made from the rock contained only in bins 2–4 (FIG. 1), it would be possible for him to adjust the movable blade 561a of switch 561 so that it contacts the "off" contact 561c instead of the "on" contact 561b. In that case the feed stream $F_1$ would be maintained closed off by virtue of the lack of any control signal appearing on line 161. In like manner any of the other feed streams may be turned off.

It will be evident to those skilled in the art that the computing and control arrangement shown in FIGS. 3, 4 and 5 may be utilized as a separate manually operated means for computing and indicating values of feed rate for the individual feed streams under certain predetermined conditions. Thus, the equipment shown can be utilized for off stream analysis as well as the on stream control function shown in FIG. 1 and described above. In such a case the input shafts 40–44 of FIG. 3 are manually adjusted by external knobs and the outputs on lines 161–164 could then be read by the several meters 161a–164a. The operator can utilize the information obtained from meters 161a–164a for the purpose of which could be utilized correcting manually adjustments on the rate of feed of the individual feeders.

When it is desirable that the control of the cement product should be on the basis of preset relative amounts of the constituent oxides rather than of the cement compounds, then all of the conversions utilizing the inverted stoichiometric equations can be omitted from FIGS. 3, 4 and 5 and the holding point values can be in terms of oxides.

In some cement plants the blended raw feed is burned immediately in the kiln and does not first get stored in a product basin such as 26 of FIG. 1; such systems feed the blended raw feed materials through line 22 and sampler 24 directly into the kiln. With such an arrangement it is undesirable to attempt a later correction of deviations in the blend of the raw feed materials produced at any particular time. Therefore, the system of FIG. 1 must be modified to accommodate such a change in characteristic. The modification required involves the suspension of all integrating actions associated with any feed rate signal which is at a limiting value. One useful modification is shown in FIG. 7 which is similar to FIG. 1 except that the inverse equation computer 136, the control 120, the integrating unit 110 and the flow correction unit 96 of FIG. 1 are all replaced by the inverse equation computers 710 and 712, the multiplier 714 and the controllers 721–724.

Whereas in FIG. 1 the control units 120 preceded the inverse equation computer 136, the type of control required for the altered system requires that the inverse equation computations be carried out prior to the control function and hence inverse equation computer 710 precedes the controllers 721–724. Thus, the controllers 721–724 may each include a reset limiting feature such as commonly found in process controllers.

In FIG. 7, the signals on lines 91–94 which are similar to those signals derived from corresponding numbered lines in FIG. 1 are fed to the multiplier 714 which has as an input a signal corresponding to $\xi$, which signal appears on line 740. Each of the deviation signals appearing on lines 91–94 is multiplied by the value of $\xi$ in multiplier 714 to put the deviation quantities on an unburned basis. The multiplier 714 could, for example, include a servo unit operable in accordance with the signal on line 740. The servo unit could be connected to simultaneously vary the variable taps of individual potentiometers having potential supplies from the respective lines 91–94. Other means for multiplying two signals may obviously be used as may be desired. The output of multiplier 714 on lines 741–744 would then respectively correspond with the quantities appearing in FIG. 3 on lines 111–114 respectively with the omission of the flow correction factor introduced by potentiometers 352, 358–360. The inverse equation computer 710 could be constructed as shown in FIGS. 4 and 5 with the omission of the potentiometer slidewires 141–144 and their associated circuitry. Likewise line 740 from the inverse equation computer 710 would correspond with line 165 in FIG. 5. The outputs from the inverse equation computer 710 on lines 751–754 provide the individual feed rate deviation signals for the feed streams 11–14, respectively. These signals are then inputs to the controllers 721–724. The controllers 721–724 may, for example, be controllers of the type disclosed in U.S. Patent 3,092,321 of E. J. Cranch et al. and may also desirably include the features of U.S. Patent application Ser. No. 298,055 filed by said Cranch. These controllers may utilize any of the normal control functions, such as proportional and reset action, as may be required. It will be evident from U.S. Patent 3,092,321 that the respective signals on lines 771–774 may be introduced at terminal 77 in FIG. 1 of the patent. The output line 57 of the patent (FIG. 1) may then be connected to the respective lines 161–164. Thus, the outputs of the individual controllers 721–724 which appear on lines 161–164, respectively, are a function of the feed forward signals produced on the respective lines 771–774 by inverse equation computer 712 as well as the signals on lines 751–754.

Inverse equation computer 712 may be constructed as shown in FIGS. 4 and 5 with the omission, however, of the input lines 121–124. The inverse equation computer 712 utilizes the set point values appearing on lines 151–154 in the same fashion as they are utilized in the diagram of FIG. 4. There is thus produced as an output of inverse equation computer 712 on lines 771–774, feed forward signals indicative of the normalized feed rates anticipated for the individual feed lines 11–14 when the holding point values are as set on potentiometers 141–144.

It is evident that the signals supplied by the addition of the feed forward signals to the control from the feedback control signals when added together give control signals on lines 161–164 indicative of the normalized rates required of the individual feed streams 11–14, represented by the quantities $F_1^*$–$F_4^*$. As mentioned previously, the normalized feed rate signals on lines 161–164 may be utilized to provide indications on the meters 161a–164a of those normalized feed rates by virtue of the connections of meters 161a–164a to the signals on lines 161–164 by connecting lines 161b–164b.

While the above described system is a preferred means and method for effectively controlling the quality of cement being produced in a cement plant by the close control of the feed rates of the individual streams of raw feed material being blended for the production of that cement, it will be evident to those skilled in the art that certain modifications may be made of the disclosed systems while still utilizing the essential novel features of this invention. It will also be evident that an equivalent digital computer means may be utilized to carry out the novel method of this invention.

What is claimed is:

1. In a cement production system which continuously blends a plurality of different feed rock streams before burning the resulting mixture in a kiln, a system for controlling the individual rates of feed of each of said streams so as to produce as nearly as possible preset percentages of the constituent cement compounds expected in the product comprising
   means for continuously producing a plurality of first feedback signals indicative of the percentage by weight on a nonignited basis of the constituent oxides of said blended stream,
   means for computing from said first feedback signals a plurality of second feedback signals indicative of the percent by weight of each of the said constituent cement compounds on an ignited basis,
   means for comparing each of said second feedback signals with a signal representing a preset percentage by weight desired for the corresponding one of said constituent cement compounds to thereby establish a separate feedback control signal indicative of the error in percentage by weight of each of the said constituent cement compounds, and
   means operable in response to said feedback control signals to correct the rate of feed of each of said feed streams.

2. In a cement production system which continuously blends a plurality of different feed rock streams before burning the resulting mixture in a kiln, a system for controlling the individual rates of feed of each of said streams so as to produce as nearly as possible a desired cement product comprising
   means for continuously producing a plurality of feedback signals indicative of the composition of said blended stream,
   means for comparing said feedback signals with corresponding signals representing a preset desired composition to thereby establish feedback control signals indicative of the errors in the said composition, and
   means operable in response to said feedback control signals to correct the rates of feed of each of said feed streams as required to reduce said errors.

3. A system for controlling the composition of cement compounds produced by the kiln burning of a raw feed which is a blend of a plurality of different raw feed streams comprising
   means for continuously producing a first feedback signal representing the relative amount of each of certain significant oxides of the blended raw feed,
   means for producing from said first feedback signals second feedback signals each indicative of the relative amount of one of a plurality of the final cement compounds expected from an ignition of said blended raw feed in said kiln,
   means for comparing said second feedback signals and signals representing desired values for said relative amounts of said final cement compounds to establish final feedback signals,
   means responsive to said final feedback signals and to feed forward signals corresponding to said desired values for establishing feed rate signals indicative of required normalized feed rates for each of said raw feed streams,
   means for producing a signal indicative of the total rate of feed of said blended raw feed stream, and
   means responsive to said feed rate signals and said signal indicative of the total rate of feed of said blended raw feed for controlling the rates of feed of each of said plurality of raw feed streams.

4. A computer for determining a non-unique set of values for a plurality of output signals each of which is constrained to a predetermined range of magnitudes, the determination being made so as to minimize the sum of the squares of the difference between each of a like plurality of first computer signals computed from existing values of said output signals and corresponding input signals when said squares of the differences are weighted relative to one another by factors indicative of the relative importance of minimizing said differences, comprising
   means responsive to said output signals for producing said first computer signals in accordance with predetermined functional relationships,
   means for establishing second computer signals representing the said difference between said first computer signals and corresponding input signals,
   means for separately modifying each of said second computer signals as required to effect a predetermined desired relationship between the values of said second computer signals,
   means for establishing a plurality of third computer signals from said modified second computer signals in accordance with a modification of said predetermined functional relationships, and
   means for integrating each of said third computer signals to produce output signals which vary until said third computer signals all are reduced to zero thereby to accomplish the minimization.

5. A computer for determining a non-unique set of values for a plurality of output signals each of which is constrained to a predetermined range of magnitudes, the determination being made so as to minimize the combination of the sum of the squares of the difference between each of a like plurality of first computer signals, computed from existing values of said output signals in accordance with predetermined functional relationships, and the corresponding input signals when said squares of the differences are weighted relative to one another by factors indicative of the relative importance of minimizing said differences and a linear sum of said output signals when said output signals are each weighted relative to one another by factors indicative of the relative importance of minimizing said output signals, comprising
   means responsive to said output signals for producing said first computer signals in accordance with the predetermined functional relationships,
   means for establishing second computer signals representing the said difference between said first computer signals and corresponding input signals,
   means for separately modifying each of said second computer signals as required to effect a predetermined desired relationship between the values of said second computer signals,
   means for establishing a plurality of third computer signals from said modified second computer signals in accordance with a modification of said predetermined functional relationships,
   means for separately modifying each of said third computer signals by the addition of a constant for weighting said linear sum, and
   means for integrating each of said third computer signals to produce corresponding output signals which vary until said modified third computer signals all are reduced to zero thereby to accomplish the minimization.

6. A computer for determining a non-unique set of output signals of one polarity each of which represents a computed normalized value of the rate of feed of one of a plurality of feeders supplying raw material to be blended and burned for the manufacture of a cement product which includes a mixture of certain cement compounds, comprising means responsive to said output signals for producing a plurality of first computer signals each representing the relative rate of feed of a different constituent oxide in the said raw material at the computed feed rate, means responsive to said output signals for producing a second computer signal representative of the expected fraction of said raw material which will form said cement product after burning when said feeders are operated at said computed feed rate, means for producing a plurality of input signals each representative of the desired relative amount on a burned basis of a different one of the cement compounds expected in the said cement product, means for modifying said input signals in response to said second computer signal to convert said input signal to an unburned basis, means selectively responsive to said first computer signals and to said converted input signals to produce a plurality of error signals each representing on an unburned basis the deviation from said desired value of the relative amount of a different one of said cement compounds expected when said raw material is supplied at said computed feed rates, means responsive to the difference between the sum of said first computer signals and said second computer signal to produce another error signal indicative of the deviation of the total of the relative rate of feed of said constituent oxides from the total which will cause the sum of said normalized feed rates to equal unity, means for modifying each of said error signals by a factor in accordance with the relative minimization desired for said error signals, and means responsive to said modified error signals for changing said output signals until said error signals are minimized to thereby obtain an optimum mixture of said expected cement compounds.

7. A computer for determining a non-unique set of output signals of one polarity each of which represents a computed normalized value of the rate of feed of one or a plurality of feeders for blending different materials some of which have common constituents comprising means responsive to said output signals for producing a plurality of first computer signals each representing the relative rate of feed of a different constituent in said materials at the computed feed rate, means responsive to said output signals for producing a second cumputer signal representative of the sum of said normalized feed rates, means for producing a plurality of input signals each representative of the desired relative amount of a different one of the constituents of the product resulting from said blending, means selectively responsive to said first computer signals and to said input signals to produce a plurality of error signals each representing the deviation from said desired value of the relative amount of a different one of said constituents when said material is blended at said computed feed rates, means responsive to the difference between said second computer signal and a signal representing unity to produce another error signal indicative of the deviation of the total of the relative rate of feed of said constituents from unity, means for selectively weighting said error signals by factors determined by the relative minimization desired for said error signals, and means responsive to said weighted error signals for changing said output signals until the sum of the weighted errors squared is minimized to thereby obtain an optimum blend in said product.

8. A system for continuously controlling the feed rate of a plurality of raw materials to be blended and ignited so as to produce a batch mixture of said raw materials which will produce upon burning a mixture of cement compounds which approaches a minimum cost mixture when the relative quantities of the expected constituent compounds are within a predetermined range of the desired relative quantities and which approaches a minimum deviation from said desired relative quantities when those quantities are outside said range comprising means operable to produce a first feedback signal representative of the relative quantity of each of the constituent oxides in the stream of said blended raw materials, means for converting said first feedback signals to second feedback signals each representing the relative quantity of one of said expected constituent cement compounds, means for comparing each of said second feedback signals with corresponding predetermined holding point values for the relative quantities of each of said constituent cement compounds and integrating the differences therebetween to produce a feedback control signal representing the deviation from said holding point values of said relative quantity of each of the said constituent cement compounds expected from said batch mixture, means for computing feed rate control signals in accordance with said holding points, means for continuously modifying said feed rate control signals in accordance with said feedback control signals to correct the computed feed rate control signals to compensate for said deviation, and means responsive to said corrected feed rate control signals for continuously controlling the actual feed rates.

9. A system for continuously controlling the feed rate of a plurality of raw materials to be blended and ignited so as to produce a mixture of said raw materials which will produce upon burning a mixture of cement compounds which approaches a minimum cost mixture when the relative quantities of the expected constituent cement compounds are within a predetermined range of the desired relative quantities and which approaches a minimum deviation from said desired relative quantities when those quantities are outside said range comprising means operable to produce a first feedback signal representative of the relative quantity of each of the constituent oxides in the stream of blended raw materials, means for converting said first feedback signals to second feedback signals each representing the relative quantity of one of said expected constituent cement compounds, means for comparing each of said second feedback signals with corresponding predetermined holding point values for the relative quantities of each of said constituent cement compounds, means responsive to said comparisons for producing feedback control signals representing the deviations from said holding point values of said relative quantities of the said constituent cement compounds in terms of feed rate deviations, means for producing feed rate signals corresponding to said holding points, and control means responsive to said feed rate signals and said feedback control signals for continuously controlling the actual feed rates of said raw materials.

10. A control system according to claim 8 in which said feed rate control signal modifying means comprises
means adjustable in accordance with the relative amounts of the constituent oxides in each of said raw materials to establish oxide signals representing relative amounts of the constituent oxides in the blended raw feed stream in response to signals representing the computed feed rates,
means responsive to said oxide signals, to signals representing said holding points and to said feedback control signals to establish error signals representing the deviation of the relative amounts of the constituent cement compounds as established from said relative amounts of said oxides in the blended feed stream from said holding points as modified by said feedback control signals,
means for modifying each of said error signals in accordance with individual first weighting factors for weighting said error signals in accordance with closeness of control desired for the particular constituent cement compounds represented, and
means responsive to said modified error signals and to other weighting factors indicative of the cost of said individual raw materials and operable to provide integrated feed rate error signals as said corrected feed rate control signals.

11. In a system for continuously controlling the feed rates of each of a plurality of raw materials which are to be blended and accumulated in a batch mixture before being ignited for burning so as to produce a cement product having a predetermined desired mixture of the several cement compounds resulting from such burning, the method comprising the steps of
producing a plurality of first feedback signals each continuously representative of one of the constituent oxides in the blended raw material stream,
converting these first feedback signals into second feedback signals each of which represents the relative amount of a particular cement compound which is expected to result from the burning of the constituent oxides in the blended raw material,
comparing the second feedback signals to corresponding signals representing predetermined holding point values for those constituent cement compounds,
integrating the resulting difference in the compared signals to produce individual feedback control signals representing the deviation from its particular desired holding point value of each of the constituent cement compounds in the accumulated batch mixture,
producing signals representative of the individual raw material feed rates in accordance with the predetermined holding point values as modified by the feedback control signals to correct the computed feed rates to take into account the deviations which have occurred in the constituent oxides which make up the blended raw feed in the batch mixture, and
continuously controlling the actual feed rates with the corrected computed feed rate signals.

12. In a system for continuously controlling the feed rates of each of a plurality of raw materials to be blended and accumulated in a batch mixture before being ignited for burning so as to produce a cement product having a predetermined desired mixture of the several cement compounds resulting from such burning, the method comprising the steps of
producing a first feedback signal representative of the relative quantity of each of the constituent oxides in the blended raw materials,
converting the first feedback signals to second feedback signals each representing the relative quantity of one of the expected constituent compounds,
comparing each of the second feedback signals with corresponding predetermined holding point values for the relative quantities of each of the constituent cement compounds,
producing feedback control signals representing the deviations from the holding point values of the relative quantities of the constituent cement compounds in terms of feed rate deviations,
establishing feed rate signals corresponding to the holding points, and
controlling the actual feed rates of each of the raw materials by means of the feed rate signals and the feedback control signals.

References Cited

FOREIGN PATENTS 910,614    11/1962    Great Britain.

OTHER REFERENCES

Bedworth and Faillace, Instrumenting Cement Plants for Digital Computer Control, ISA Journal, November 1963, pp. 47–54.

Blending by Analog Computer, E. E. L. Mitchell and G. R. Marr, Jr., Control Engineering, November 1963, pp. 107–110.

MALCOLM A. MORRISON, Primary Examiner

EDWARD J. WISE, Assistant Examiner

U.S. Cl. X.R.

22—76; 235—151.1, 151.35, 185